United States Patent [19]
Takada et al.

[11] Patent Number: 5,457,406
[45] Date of Patent: Oct. 10, 1995

[54] BIDIRECTIONAL SIGNAL TRANSMISSION CIRCUIT AND TERMINATOR

[75] Inventors: Yoshifumi Takada, Hiratsuka; Masaaki Kamemura; Masakazu Yamamoto, both of Hadano, all of Japan

[73] Assignee: Hitachi, Ltd., Tokyo, Japan

[21] Appl. No.: 31,854

[22] Filed: Mar. 16, 1993

[30] Foreign Application Priority Data

Mar. 17, 1992 [JP] Japan .................................. 4-059973

[51] Int. Cl.$^6$ ..................... H03K 17/16; H03K 19/0175
[52] U.S. Cl. .......................... 326/30; 326/90; 333/32; 327/315; 327/318
[58] Field of Search .................... 326/30, 90; 333/32; 375/36; 327/315, 318, 321–322, 327, 330

[56] References Cited

U.S. PATENT DOCUMENTS

| | | | |
|---|---|---|---|
| 3,585,399 | 6/1971 | Andrews, Jr. | 326/30 |
| 4,414,480 | 11/1983 | Zasio | 326/30 |
| 5,138,203 | 8/1992 | Ono et al. | 326/21 |

FOREIGN PATENT DOCUMENTS 58-92139  6/1983  Japan .

OTHER PUBLICATIONS

"Diodes Damp Line Reflections Without Overloading Logic", Electronics, Feb. 1976, pp. 123–127, E. E. Davidson et al.

Primary Examiner—Edward P. Westin
Assistant Examiner—Richard Roseen
Attorney, Agent, or Firm—Antonelli, Terry, Stout & Kraus

[57] ABSTRACT

In such a bidirectional signal transmission circuit in which the transmitter circuit of the logic circuit elements used in the conventional single end transmission circuit can be utilized by setting an impedance of an end circuit to be a value greater than a characteristic impedance of a transmission path, by shortening a length of the transmission path for connecting the end circuit with the logic circuit elements, and by increasing an amplitude of an input signal with utilization of a reflection wave produced by an impedance mismatching, such a signal transmission circuit where various types of transmission circuits such as a bidirectional signal transmission circuit and a single end transmission circuit are employed in a mixture form, can be made compact, and low power consumption can be achieved.

24 Claims, 7 Drawing Sheets

BIDIRECTIONAL SIGNAL TRANSMISSION CIRCUIT AND TERMINATOR

BACKGROUND OF THE INVENTION

The present invention generally relates to a bidirectional signal transmission circuit in a computer system or the like, and more specifically, to a bidirectional signal transmission circuit suitable for making such a signal transmission circuit compact and for operating this signal transmission circuit under low power consumption, that various types of signal transmission circuits involving a single end transmission circuit are employed in a mixture form.

Figure 7A:
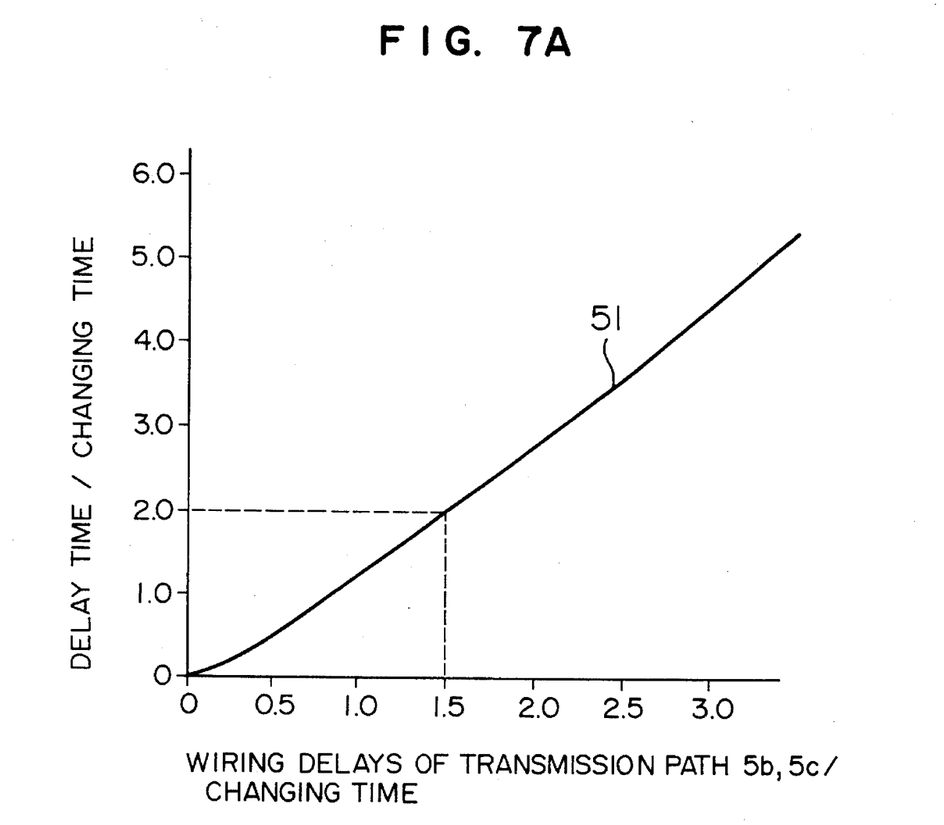
FIGS. 7A to 7C are explanatory diagram for explaining relationships between distances of the transmission lines and waveform roundings, the transmission lines being used to connect the end circuits and the input/output terminals of the bidirectional signal transmission circuits shown in FIG. 3 and FIG. 5.

In designing of a computer system, a care should be taken into a characteristic impedance of a signal line, as described in, for instance, "Designing Knowhow for Microcomputer Systems" written by Y. Hayashi and H. Tsuneda published by CQ publisher company in 1988, at pates 274 to 275. That is to say, in case that an actual distance of a transmission path for constituting a data bus becomes long, there is a problem of an occurrence of reflection. As a result, as shown in FIG. 7, an end circuit (resistor) is provided in the transmission path so as to prevent the signal reflection problem.

Figure 1A:
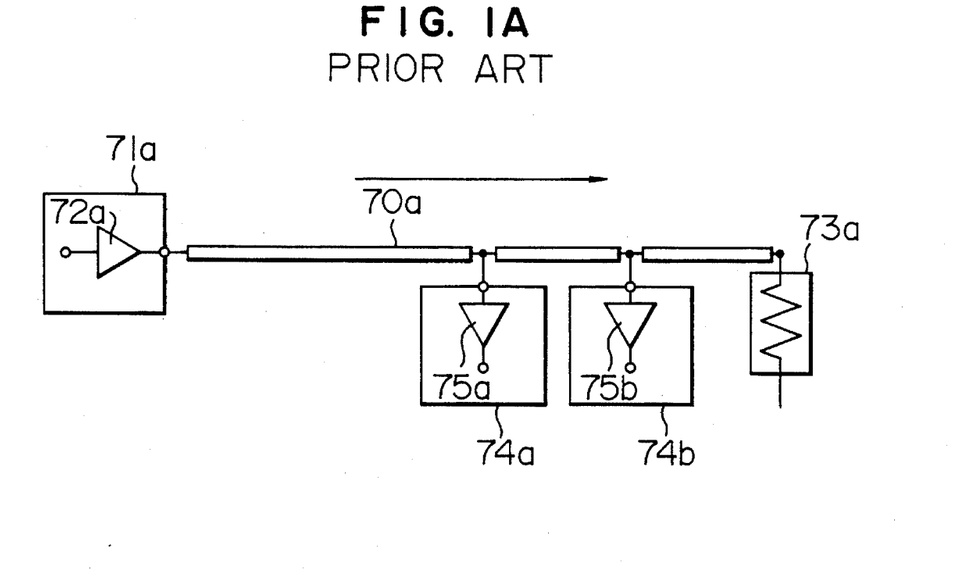
FIGS. 1A and 1B are schematic block diagrams for showing arrangements of conventional single end transmission circuits.
Figure 1B:
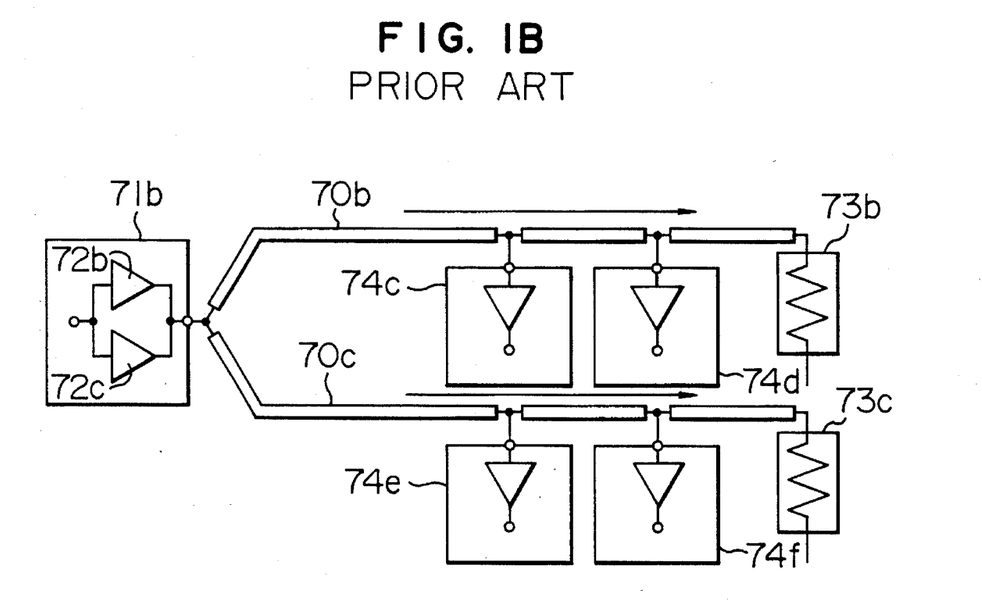

FIGS. 1A and 1B are schematic block diagrams for showing arrangements of the conventional signal transmission circuits.

As represented in FIG. 1A, as the signal transmission circuit used in the computer system, a transmission path 7a such as a wiring board is employed to connect a transmitter circuit 72a of a single circuit element (logic circuit element) 71a and one end circuit 73a, and to which receiver circuits 75a and 75b constructed of either one or plural logic circuit elements 74a and 74b are connected, to constitute a single end transmission circuit. Further, as shown in FIG. 1B, there is a double end signal transmission circuit in which transmission paths 70a and 70b are employed to connect transmitter circuits 72b, 72c constructed of a single logic circuit element 71b with two end circuits 73b, 73c, and also receiver circuits 75c to 75f constructed of a plurality of logic circuit elements 74c to 74f are connected thereto.

The conventional single end transmission circuit is described in, for example, "Microelectronics Packaging Handbook" written by Rao R. Tummala and Eugene J. Rymaszewski from Nikkei BP publisher.

In these transmission circuits, the signal transmission direction is one direction, whereas there is a certain case that a bidirectional signal transmission circuit for transmitting a signal along a bidirectional direction is used by connecting both of a plurality of transmitter circuits and a plurality of receiver circuits to the same transmission path. Since this bidirectional signal transmission circuit has various advantages that a total number of signal terminals of the logic circuit elements can be reduced and a total quantity of signal paths such as a wiring board and a signal cable can be decreased, such a bidirectional signal transmission circuit is widely utilized.

Figure 2:
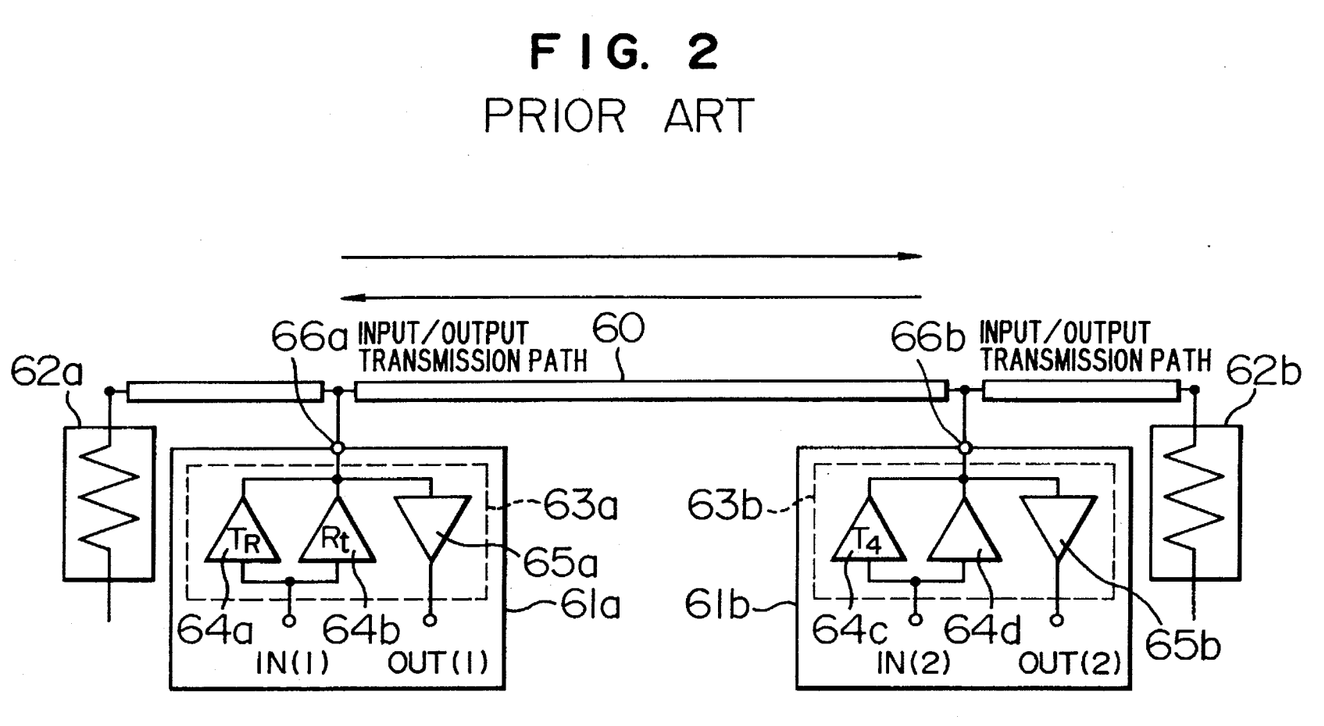
FIG. 2 is a schematic block diagram for representing an arrangement of a conventional bidirectional signal transmission circuit.

FIG. 2 is a schematic block diagram for showing an arrangement of another conventional bidirectional signal transmission circuit.

In this figure, reference numerals 61a and 61b denote logic circuit elements, and reference numerals 62a and 62b show end circuits. These circuit elements and circuits are connected with each other by way of a transmission path 60. Input/output circuits 63a and 63b of the respective logic circuit elements 61a and 61b are constructed of transmitter circuits 64a to 64d and receiver circuits 65a and 65b, which are connected to common input/output terminals 66a and 66b.

In this bidirectional signal transmission circuit, logic information is transmitted from IN (1) to OUT (2) and also from IN (2) to out (1). In any cases, the signal is transmitted via the transmission path 60 and the input/output terminals 66a and 66b.

Generally speaking, an amount of a current outputted from a transmitter circuit in a bidirectional signal transmission circuit becomes twice as that of the transmitter circuit employed in the single end transmission circuit shown in FIG. 1A. As a result, as illustrated in the bidirectional signal transmission circuit shown in FIG. 2, two sets of the respective transmitter circuits 64a to 64d employed in the input/output circuits 63a and 63b are connected in parallel with each other in order to reduce the current amount per one transmitter circuit. Otherwise, the high output transmitter circuit exclusively used in the bidirectional signal transmission circuit must be utilized so as to reduce the current amount. As a consequence, there is a problem that the chip area occupied by the transmitter circuits 64a to 64d becomes large in the logic circuit elements 61a and 61b. Also, there is another problem that power consumption per one transmission path becomes high.

In case that the transmitter circuits function as signal receiving ends, when the output impedances of the transmitter circuits 64a to 64d in the input/output circuits 63a and 63b of the logic circuit elements 61a and 61b are not sufficiently high values, a waveform rounding happens to occur in a signal, which is caused by the currents flowing through these transmitter circuits 64a to 64d. As a consequence, the output impedances of the transmitter circuits 64a to 64d which functions are the signal receiving ends, must be selected to be sufficiently high values.

However, generally speaking the reflection waves cased from the load (74a etc.) are propagated to the single end transmission circuit shown in FIG. 1A, and then may cause the reflection noise to be reduced, which is produced by the mismatching phenomenon between the output impedance thereof and the characteristic impedance of the transmission path 70a. As a consequence, the output impedance of the transmitter circuit 72a is designed to be substantially equal to, or smaller than the characteristic impedance of the transmission path.

In view of differences in the demands for the above-explained output current amount of the transmitter circuit and the output impedance, the same transmitter circuit as the transmitter circuit 72a employed in the single end transmission circuit shown in FIG. 1B, cannot be directly utilized as the transmitter circuits 64a to 64d of the bidirectional signal transmission circuit shown in FIG. 2.

SUMMARY OF THE INVENTION

The conventional problems to be solved are as follows. That is, since the conventional transmitter circuits employed in the single end transmitter circuit cannot obtain a sufficiently large signal amplitude, and also only one transmitter circuit cannot be directly employed in the transmitter circuits of the bidirectional signal transmitter circuit to commonly use the transmitter circuits, the bidirectional signal transmission circuit cannot be made compact and be operated under low power consumption. Furthermore, such a transmission circuit that various types of signal transmission circuits are provided in a mixture form, cannot be effectively designed.

An object of the present invention is to solve these problems in prior art, and to achieve a compact bidirectional signal transmission circuit operable under low power consumption by commonly utilizing the transmitter circuits within the single end transmission circuit and the bidirectional signal transmission circuit, and also to provide a bidirectional signal transmission circuit capable of designing at a high efficiency, such a transmission circuit that various types of signal transmission circuits are employed in a mixture form.

To achieve the above-described object, a bidirectional signal transmission circuit, according to the present invention, is characterized by comprising (1) a transmission medium for transmitting a signal;

a plurality of logic circuit elements for performing an input/output operation of either the signal derived from said transmission medium, or the signal supplied to said transmission medium via a single input/output terminal respectively; and an end circuit having a higher impedance than a characteristic impedance of said transmission medium, and connected across said transmission medium.

Also, (2) in the bidirectional signal transmission circuit as described in the above item (1), said logic circuit elements includes a transmitter circuit having an output impedance identical to said characteristic impedance of said transmission medium in case that a signal is sent out via said input/output terminal to said transmission medium and a signal is received via said input/output terminal from said transmission medium.

Further (3) in the bidirectional signal transmission circuit as described in the above item (1), said logic circuit elements includes a transmitter circuit having an output impedance lower than the characteristic of said transmission medium in case that a signal is sent out via said input/output terminal to said transmission medium and a signal is received via said input/output terminal from said transmission medium.

Also, (4), in the bidirectional signal transmission circuit as described in any one of the above-described items (1) to (3), said logic circuit elements include both of an ECL (emitter coupled logic) type transmitter circuit and an ECL type receiver circuit for receiving a signal derived from said transmission medium via said input/output terminal.

Furthermore, (5), in the bidirectional signal transmission circuit as described any one of the above items (1) to (4), said end circuit has an arbitrary impedance 1.2 times to 2.0 times higher than the characteristic impedance of said transmission medium.

Then, (6), in the bidirectional signal transmission circuit as described in any one of the above items (1) to (5), a transmission path for connecting said circuit elements with said end circuit located nearest said circuit elements, has a length shorter than, or equal to a value 1.5 times longer than a distance over which a signal is propagated during a changing time of said signal in said circuit elements.

According to the present invention, the impedance of the end circuit is selected to be higher than the characteristic impedance of the transmission path, so that the reflection waves caused by the impedance mismatching are overlapped, or superimposed on the input signal wave, and therefore the amplitude of the input signal can be increased. In particular, the length of the transmission path defined from the end circuit to the input/output terminal is made short, so that such an overlapping effect by the reflection waves can be firmly performed. As a result, even when only one transmitter circuit employed in the single end transmission circuit is used in the bidirectional signal transmission circuit, the input waveform having a sufficiently great amplitude can be obtained.

Also, the length of the transmission path from the end circuit to the input/output terminal is set to be such a value shorter than, or equal to 1.4 times longer than the distance over which the signal is propagated during the changing time of the signal. As a result, not only the overlapping effect of the reflection waves can be surely achieved, but also the time period during which the signal waveform is rounded can be shortened. Thus, the operation of the circuit element can be increased.

Also, since the impedance of the end circuit is made 1.2 to 2.0 times greater than the characteristic impedance of the transmission path, reduction in the signal amplitude of the ECL type transmitter circuit can be further suppressed.

DESCRIPTION OF THE PREFERRED EMBODIMENTS

Figure 3:
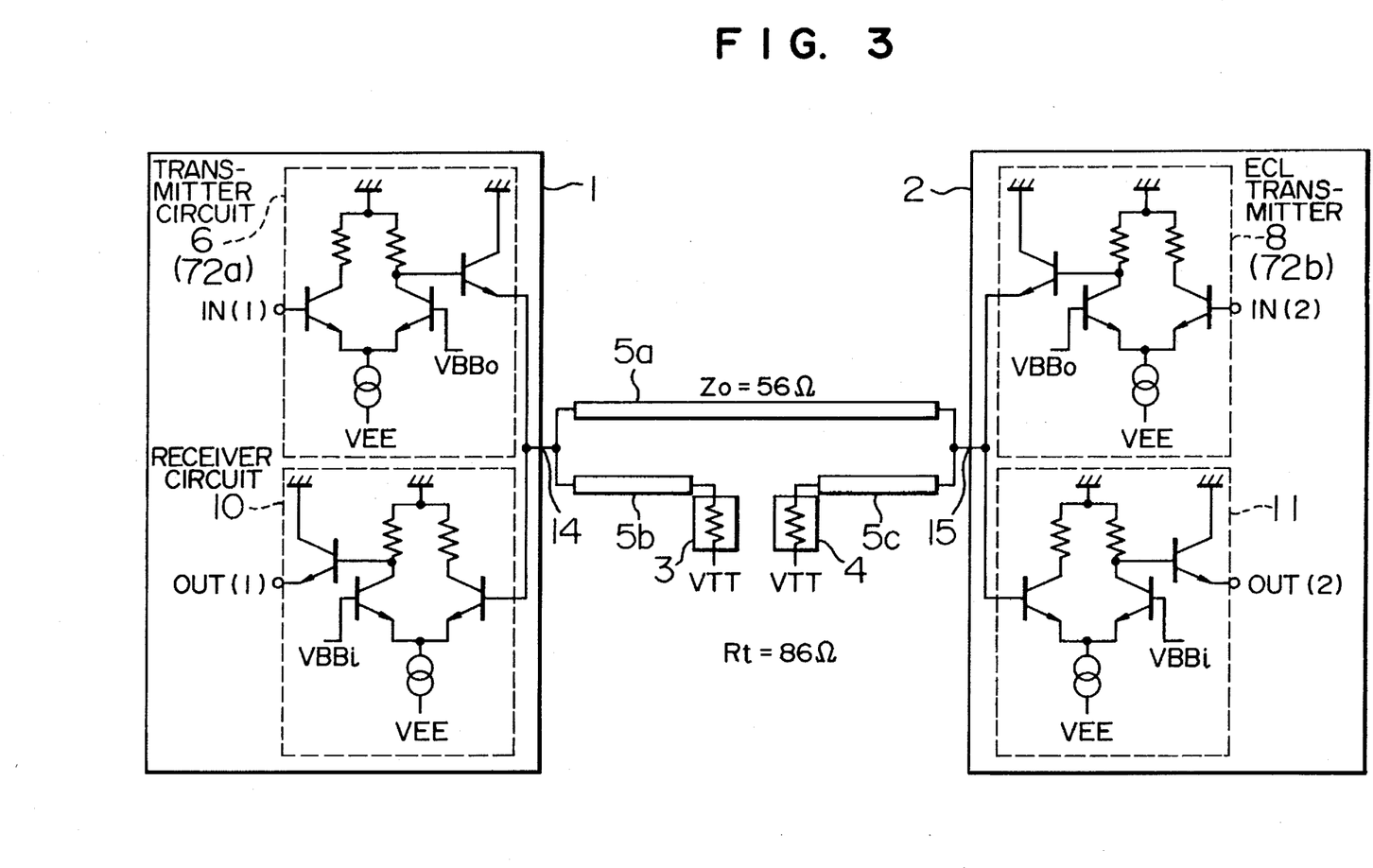
FIG. 3 shows a circuit diagram of a bidirectional signal transmission circuit according to one preferred embodiment of the present invention.

FIG. 3 schematically shows a circuit diagram of a bidirectional signal transmission circuit according to one preferred embodiment of the present invention.

The bidirectional signal transmission circuit according to this preferred embodiment of the present invention is arranged as follows. An input/output terminal 14 of a logic circuit element (circuit element) 1 is connected via a transmission line 5a to an input/output terminal 15 of a logic circuit element (circuit element) 2. Also, an end circuit 3 is connected via another transmission line 5b to the input/output terminal 14 of the logic circuit element 1, and furthermore another end circuit 4 is connected via a transmission line 5c to the input/output circuit 15 of the logic circuit element 2. Transmitter circuits 6 and 8 of the logic circuit elements 1 and 2, and also receiver circuits 10 and 11 thereof are of ECL (Emitter Coupled Logic) type circuits.

Then, in the bidirectional signal transmission circuit according to this preferred embodiment, the end circuits 3 and 4 correspond to resistors having 86 ohms, characteristic impedance of the transmission lines 5a to 5c are 56 ohms, and resistances (impedances) of the end circuits 3 and 4 are higher than the characteristic impedances of the transmission lines 5a to 5c.

A description will now be made of operations in the bidirectional signal transmission circuit with such a circuit arrangement, according to this preferred embodiment of the present invention.

At a certain time instance, when information is transferred from an IN (1) of the logic circuit element 1 to an OUT (2) of the logic element circuit 2, the transmitter circuit 6 outputs a signal and the receiver circuit 11 receives this signal. In general, since an output impedance of an ECL circuit becomes low at a high level output; and becomes high at a low level output, the transmitter circuit 8 of the logic circuit element 2 at the signal reception side is brought into a high output impedance condition as a low level output, and also does not give any adverse influence to a transmitted signal waveform. However, according to this preferred embodiment, since there is employed such a transmitter circuit as same a the transmitter circuit 72a of the single end transmission circuit shown in FIG. 1A, an output impedance of the ECL type transmitter circuit 8 is substantially equal to the characteristic impedance of the transmission path 5a, or lower than this characteristic impedance.

As a consequence, when a changing signal outputted from the transmitter circuit 6 is transferred to the transmission path 5a whose characteristic impedance is 56 ohms, and then reaches the input/output terminal 15, a current starts to flow from an emitter of an output transistor employed in the transmitter circuit 8, and may cause an amplitude of a signal to be reduced when an input waveform is changed.

However, according to this preferred embodiment, due to a mismatching between the characteristic impedances ($Z_0$= 56 ohms) of the transmission paths 5b and 5c, and also the impedance (resistance) ($R_f$=86 ohms) of the end circuit 4, reflection waves with a reflecting coefficient of approximately 20% happen to occur. Then, since the lengths of the transmission circuits 5b and 5c are made short, for example, 100 mm, these reflection waves are overlapped with each other when the signal of the input waveform is changed at the reception side, so that such an input waveform having a sufficient signal amplitude can be obtained.

Figure 4:
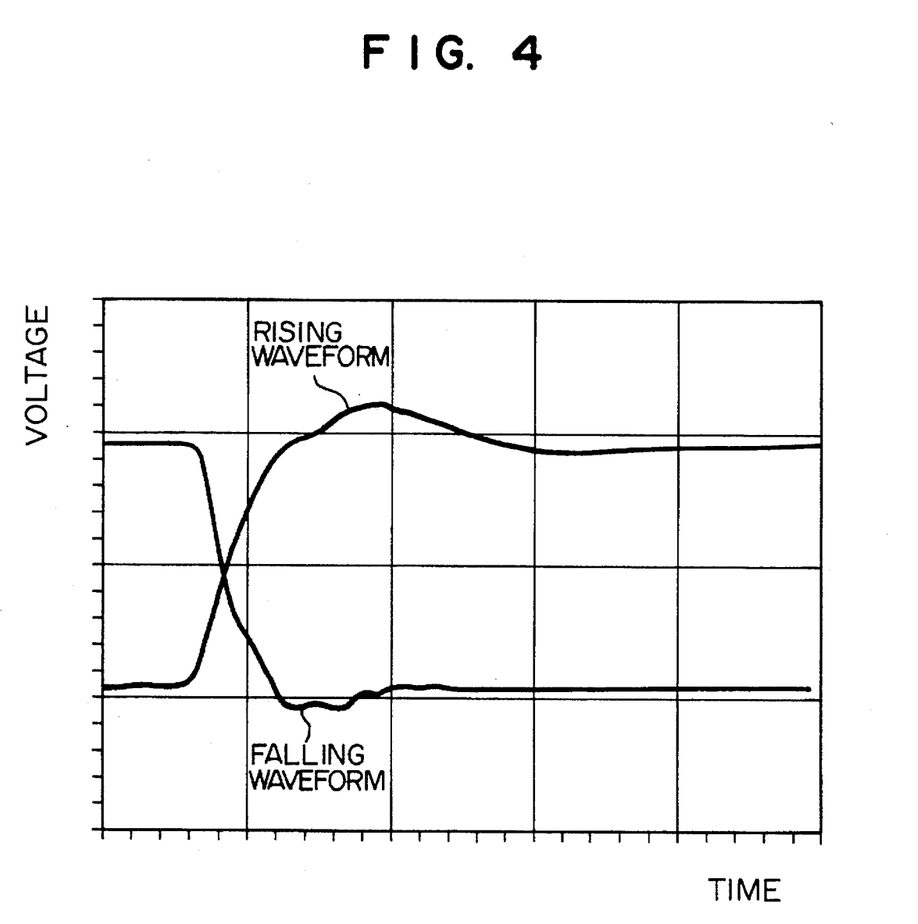
FIG. 4 is an explanatory diagram for explaining signal waveforms appearing at an input and output terminal of a logic circuit element shown in FIG. 3, according to one preferred embodiment.

FIG. 4 is an explanatory diagram of signal waveforms, according to one preferred embodiment, appearing at the input/output terminal of the logic circuit element shown in FIG. 3. It should be noted that two discrete signals are shown in a single graphic representation, for the sake of convenience.

In accordance with this preferred embodiment, there are shown signal waveforms appearing at the input/output terminal at the signal reception side under such a condition that lengths of the transmission lines 5a, 5b and 5c indicated in FIG. 3 are selected to be 300 mm, 100 mm, and 100 mm, respectively. Also, as apparent from this graphic representation, the amplitudes of the signals during the rising and falling times are sufficiently great.

Figure 5:
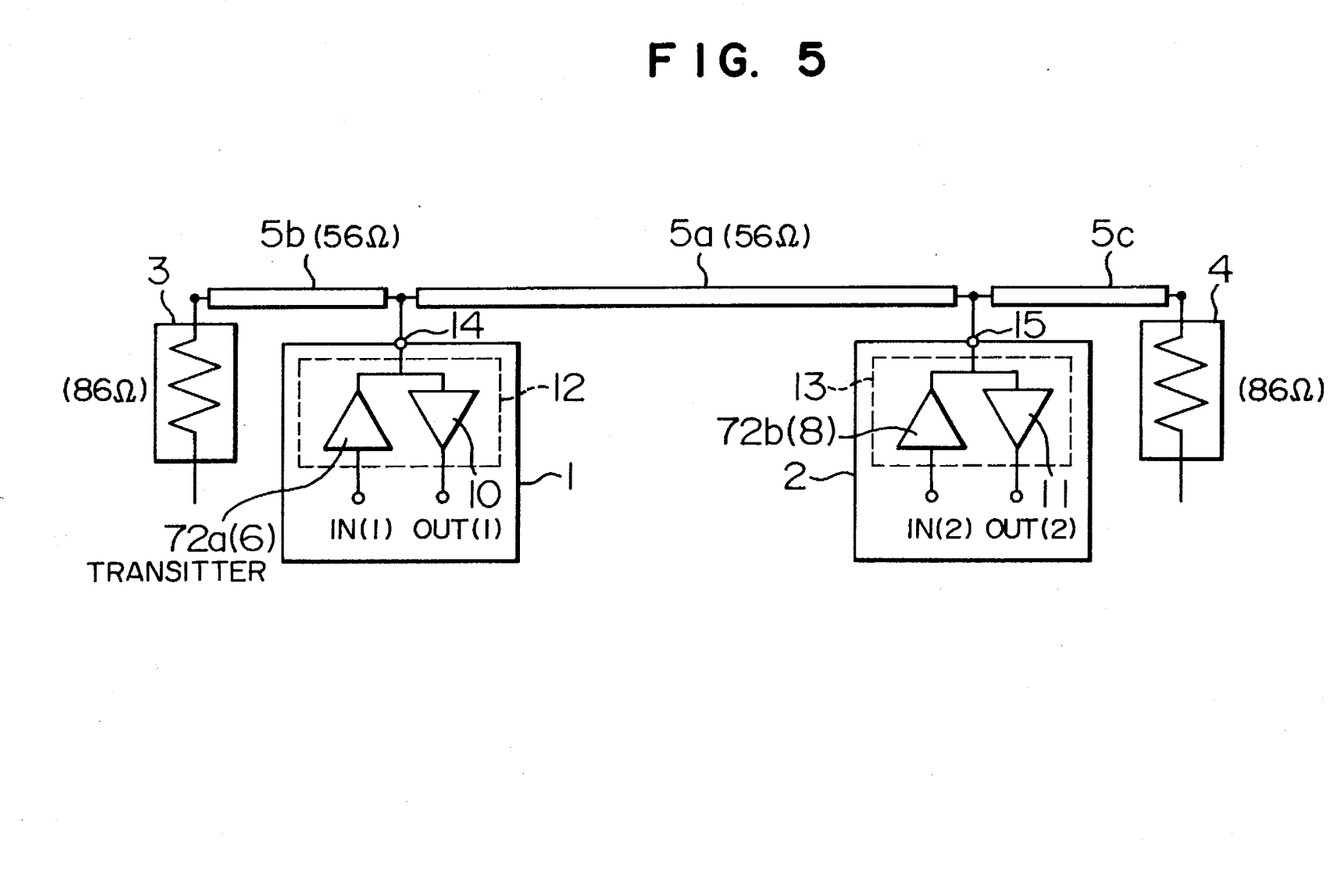
FIG. 5 indicates a circuit block diagram of an arrangement of the bidirectional signal transmission circuit shown in FIG. 1, according to one preferred embodiment.

FIG. 5 is a block diagram of a circuit arrangement of the bidirectional signal transmission circuit shown in FIG. 3, according to one preferred embodiment.

The bidirectional signal transmission circuit according to this preferred embodiment is constructed in such a manner that a transmitter circuit identical to the transmitter circuit 72a of the single end transmission circuit shown in FIG. 1A is employed in the transmitter circuit 6 of the bidirectional signal transmission circuit in FIG. 3. As shown in this figure, in accordance with the bidirectional signal transmission circuit of this preferred embodiment, since the impedances (86 ohms) of the end circuits 3 and 4 are selected to be higher than the characteristic impedances (56 ohms) of the transmission paths 5a to 5c, even if only a single transmitter circuit 72 which is used in the single end transmission circuit shown in FIG. 1B is employed, a signal having a sufficient amplitude can be obtained.

As a consequence, the transmitter circuit used in the single end transmission circuit may be utilized in the bidirectional signal transmission circuit, so that the logic circuit element and the transmission circuits can be made compact and also can be operated under low power consumption.

It should be noted that since a signal waveform owns such a signal amplitude that a signal is transmitted through a transmission path with a half impedance of the characteristic impedance of the transmission path during such a time period when the signal is transmitted from the logic circuit element 2 to the end circuit 4, and reflection waves occurred at this end circuit 4 are returned to the input/output terminal 15 of the logic circuit element 2, a length measured from the end circuit 4 to the input/output terminal 15 is preferably made short.

Further, if the transmitter circuit 72a having a not sufficient output impedance as employed in the signal end transmission circuit shown in FIG. 1A, would be used in the input/output circuits 12 and 13, for instance, waveform roundings may happen to occur at the input/output terminal 15 of the logic circuit element 2 at the signal reception side. If the reflection waves produced due to an impedance mismatching phenomenon of the end circuit 4 and the transmission line 5c are overlapped with such a waveform rounding, then there is an effect to increase the amplitude of the signal. As a result, if another length measured from the end circuit 4 to the input/output terminal 15 is made short, a signal with a desirable waveform can be obtained in view of the circuit operation.

Then, since the reflection waves per se caused by a mismatching phenomenon between the impedance of the end circuit 4 and the impedance of the transmission circuit 5c, may cause the amplitude of the signal to be increased, there is no problem with respect to the circuit operation. However, when the reflection waves produced at this end circuit 4 are advanced and also returned through the signal transmission path 5c, a ringing phenomenon is produced in the waveform. However, this ringing phenomenon may be solved by setting the impedance of the end circuit and the like to be proper values.

As described above, in the bidirectional signal transmission circuits of FIG. 3 and FIG. 5, certain design restrictions are required with respect to both of the length of the transmission path defined from the end circuit to the input/ output terminal and the impedance of the end circuit in such a manner that these values must be selected to proper values. Referring now to FIGS. 6A to 6C and FIGS. 7A to 7C, an example of circuits capable of solving the above-described design restrictions will be explained in which an ECL circuit is employed in the transmitter circuit and the receiver circuit.

Figure 6A:
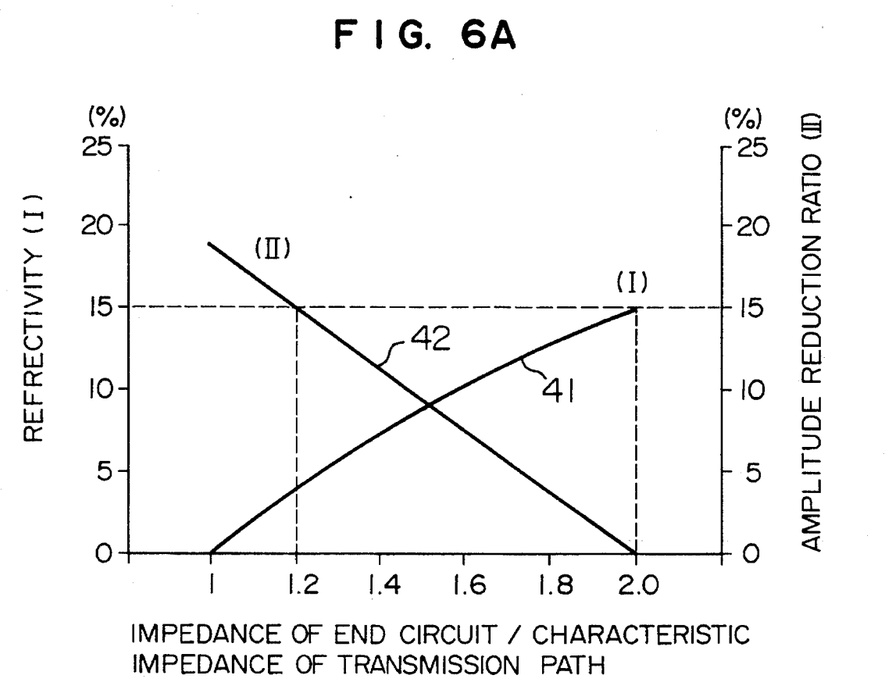
FIGS. 6A to 6C are explanatory diagrams for explaining relationships of impedances of end circuits and input/output terminals in the bidirectional signal transmission circuits represented in FIG. 3 and FIG. 5.

FIG. 6A is an explanatory diagram for representing a relationship between the impedance of the end circuit and the impedance of the transmission path in the respective bidirectional signal transmission circuits shown in FIG. 3 and FIG. 5.

In FIG. 6A, an abscissa indicates a value obtained by dividing the impedance of the end circuit by the characteristic impedance of the transmission path, namely a normalized impedance of the end circuit, whereas an ordinate denotes both of reflectivity at the end circuit and a reduction ratio of an amplitude of a signal to the amplitude of the normal signal.

When the normalized impedance of the end circuit is "1", the reflectivity of the end circuit is "0". The higher, the impedance of the end circuit is increased, the higher the reflectivity thereof is increased. Although the reflection waves produced in the end circuit per se cause the amplitude of the signal to be widened, resulting in no problem, since these reflection waves are again reflected at the load on the transmission path, which may narrow the amplitude of the signal. As a consequence, if the reflectivity of the end circuit is excessively increased, a ringing is produced in the signal waveform. To the contrary, if the reflectivity of the end circuit is excessively decreased, there is no effect to cancel the waveform roundings when the signal is changed. Therefore, the reflectivity must be selected to be a proper value as explained hereinafter.

First, in a signal transmission such as a computer system, either a reflection noise, or a crosstalk noise is superimposed on a signal waveform, which may cause a stable operation to be disturbed. To avoid such an unstable operation, a constant signal level must be maintained with regard to a threshold value. Generally speaking, when a signal level is analogous to a threshold value voltage by 15% with respect to an amplitude of the signal, noise margin involving a noise factor caused by other factors may become small. It can be seen from a reflectivity curve 41 shown in FIG. 6A that the normalized impedance of the end circuit must be properly selected in such a manner that the reflectivity should be selected to be smaller than or equal to "2".

Next, a consideration of an amplitude of a signal is made. When the normalized impedance of the end circuit is selected to be "2", since a current value of the transmitter circuit provided at the transmitter side becomes equal to a current value under normal circuit condition, an amplitude reduction ratio is equal to "0". If the impedance of the end circuit is made small, the amplitude reduction ratio becomes great. As similar to the above case, generally speaking, when a signal level is analogous to a threshold voltage by on the order of 15% with respect to an amplitude of a signal, it may be understood that noise margin involving the noise factor caused by other factors is lowered.

Since with respect to the above-described signal amplitude reduction in the ECL circuit, only the high level is analogous to the threshold value, the amplitude reduction ratio of the signal must be lower than, or equal to approximately 15%. Thus, as apparent from an amplitude reduction ratio curve 42 of FIG. 6A, the impedance of the end circuit must be selected to be about 1.2 times higher than the characteristic impedance of the transmission path.

Figure 6B:
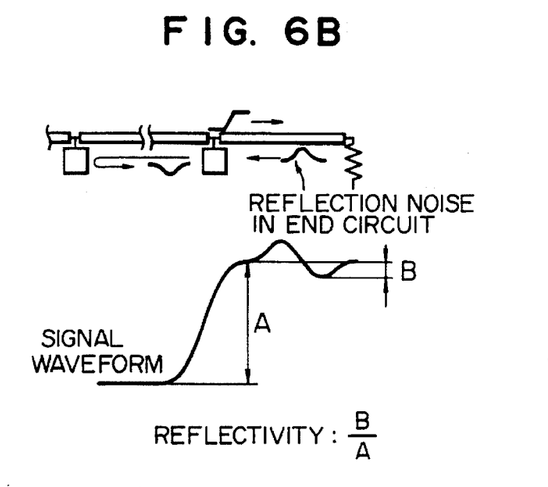
Figure 6C:
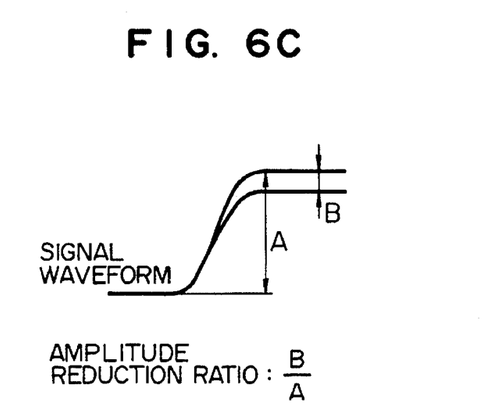

As a result of the above description, in FIGS. 6A to 6C, the normalized impedance of the end circuit must be selected to be a value between approximately 1.2 to approximately 2.0.

Figure 7B:
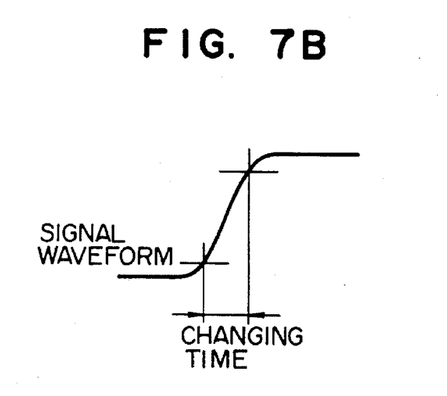
Figure 7C:
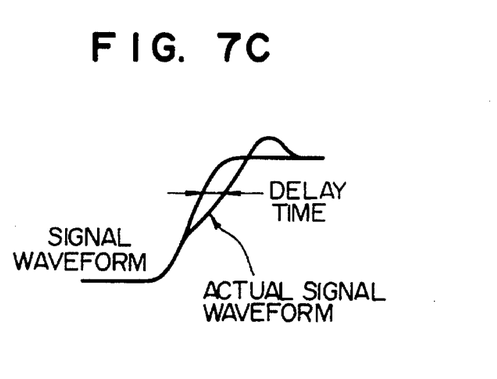

FIGS. 7A to 7C are explanatory diagrams for indicating a relationship between a waveform rounding and a distance of transmission path for connecting the end circuit and the input/output terminal in the bidirectional signal transmission circuit shown in FIG. 3 and FIG. 5.

An abscissa of FIG. 7A indicates a length of a wiring path from the end circuit to the input/output terminal. In other words, the abscissa represents wiring lengths of transmission paths 5b and 5c in the bidirectional signal transmission circuit shown in FIG. 3. Taking account of a frequency component for a signal and also a transmission speed of the transmission path, this value is normally expressed by dividing delay time of a transmission path having a wiring length thereof by a signal changing time. An ordinate of FIG. 7A indicates that waveform rounding is expressed as delay time. This delay time is divided by a signal changing time to obtain a value with respect to the frequency component.

The longer, the wiring length measured from the end circuit to the input/output terminal of the logic circuit element becomes, the longer, the waveform rounding time becomes. During this time, a logic value judgement of a signal cannot be performed under stable condition. As a consequence, the time during which the waveform roundings happen to occur is added to the transfer delay time. Generally speaking, the delay time caused by the waveform roundings must be lowered than about twice time as the changing time in a computer in which a high-speed process is required. It may been seen from a relative line 51 between a wiring length and a delay time shown in FIG. 7A that a wiring length of a transmission path from the end circuit to the input/output terminal must be selected to be such a value that a delay time of this wiring path should be shorter than, or equal to about 1.5 times longer than the changing time.

As previously explained with reference to FIGS. 3 to 7A through 7C, the impedance of the end circuit is selected to be a value greater than the characteristic impedance of the transmission path, reflection waves caused by the impedance mismatching are superimposed on the input waveform in order to increase the amplitude of the signal in accordance with the bidirectional signal transmission paths of this preferred embodiment. As a consequence, even in such a signal transmission circuit that the bidirectional signal transmission circuit, the single end transmission circuit, and the double end transmission circuit and the like are employed in a mixture state, the transmission circuit used in the single end transmission circuit can be commonly used, whereby scales of the logic circuit elements and the transmission circuits, and also power consumed in them can be reduced.

It should be noted that the present invention is not limited to the above-described preferred embodiments with reference to FIG. 3 to FIG. 7A through FIG. 7C, but may be modified without departing from the technical spirit and scope of the present invention. For example, the quantity of logic circuit element connected to the transmission path may be selected to be greater than, or equal to 2.

In accordance with the present invention, since an input waveform with a sufficiently large signal amplitude can be obtained even if only one transmitter circuit used in the single end transmission circuit is employed, the transmitter circuit employed in the single end transmission circuit can be used in the bidirectional signal transmission circuit. As a consequence, the logic circuit element can be made compact and furthermore the power consumption per the signal transmission circuit can be reduced. In addition, since the transmitter circuit is commonly designed, a high-efficient design of such a signal transmission circuit that various sorts of signal transmission circuits are employed in the mixture condition, can be achieved.

We claim:

1. A bidirectional signal transmission circuit comprising:

a transmission medium for transmitting a signal;

a plurality of logic circuit elements for performing an input/output operation of either the signal derived from said transmission medium, or the signal supplied to said transmission medium via a single input/output terminal respectively; and an end circuit having a higher impedance than a characteristic impedance of said transmission medium, and connected across said transmission medium.

2. A bidirectional signal transmission circuit as claimed in claim 1, wherein said logic circuit elements includes a transmitter circuit having an output impedance identical to said characteristic impedance of said transmission medium in case that a signal is sent out via said input/output terminal to said transmission medium and a signal is received via said input/output terminal from said transmission medium.

3. A bidirectional signal transmission circuit as claimed in claim 1, wherein said logic circuit elements includes a transmitter circuit having an output impedance lower than the characteristic of said transmission medium in case that a signal is sent out via said input/output terminal to said transmission medium and a signal is received via said input/output terminal to said transmission medium and a signal is received via said input/output terminal from said transmission medium.

4. A bidirectional signal transmission circuit as claimed in claim 1, wherein said logic circuit elements include both of an ECL (emitter coupled logic) type transmitter circuit and an ECL type receiver circuit for receiving a signal derived from said transmission medium via said input/output terminal.

5. A bidirectional signal transmission circuit as claimed in claim 2, wherein said logic circuit elements include both of an ECL (emitter coupled logic) type transmitter circuit and an ECL type receiver circuit for receiving a signal derived from said transmission medium via said input/output terminal.

6. A bidirectional signal transmission circuit as claimed in claim 3, wherein said logic circuit elements include both of an ECL (emitter coupled logic) type transmitter circuit and an ECL type receiver circuit for receiving a signal derived from said transmission medium via said input/output terminal.

7. A bidirectional signal transmission circuit as claimed in claim 1, wherein said end circuit has an arbitrary impedance 1.2 times to 2.0 times higher than the characteristic impedance of said transmission medium.

8. A bidirectional signal transmission circuit as claimed in claim 2, wherein said end circuit has an arbitrary impedance 1.2 times to 2.0 times higher than the characteristic impedance of said transmission medium.

9. A bidirectional signal transmission circuit as claimed in claim 3, wherein said end circuit has an arbitrary impedance 1.2 times to 2.0 times higher than the characteristic impedance of said transmission medium.

10. A bidirectional signal transmission circuit as claimed in claim 1, wherein a transmission path for connecting said circuit elements with said end circuit located nearest said circuit elements, has a length shorter than, or equal to a value 1.5 times longer than a distance over which a signal is propagated during a changing time of said signal in said circuit elements.

11. A bidirectional signal transmission circuit as claimed in claim 2, wherein a transmission path for connecting said circuit elements with said end circuit located nearest said circuit elements, has a length shorter than, or equal to a value 1.5 times longer than a distance over which a signal is propagated during a changing time of said signal in said circuit elements.

12. A bidirectional signal transmission circuit as claimed in claim 3, wherein a transmission path for connecting said circuit elements with said end circuit located nearest said circuit elements, has a length shorter than, or equal to a value 1.5 times longer than a distance over which a signal is propagated during a changing time of said signal in said circuit elements.

13. A bidirectional signal transmission circuit comprising:

a transmission medium for transmitting a signal;

a plurality of logic circuit elements for performing an input/output operation of either the signal derived from said transmission medium, or the signal supplied to said transmission medium via a single input/output terminal respectively, and an end circuit having a higher impedance than a characteristic impedance of said transmission medium, and connected across said transmission medium;

whereby an amplitude of the signal is increased by utilizing a reflection wave caused by an impedance mismatching between said transmission medium and said end circuit.

14. A bidirectional signal transmission circuit as claimed in claim 13, wherein said logic circuit elements includes a transmitter circuit having an output impedance identical to said characteristic impedance of said transmission medium in case that a signal is sent out via said input/output terminal to said transmission medium and a signal is received via said input/output terminal from said transmission medium.

15. A bidirectional signal transmission circuit as claimed in claim 13, wherein said logic circuit elements includes a transmitter circuit having an output impedance lower than the characteristic of said transmission medium in case that a signal is sent out via said input/output terminal to said transmission medium and a signal is received via said input/output terminal from said transmission medium.

16. A bidirectional signal transmission circuit as claimed in claim 13, wherein said logic circuit elements include both of an ECL (emitter coupled logic) type transmitter circuit and an ECL type receiver circuit for receiving a signal derived from said transmission medium via said input/output terminal.

17. A bidirectional signal transmission circuit as claimed in claim 14, wherein said logic circuit elements include both of an ECL (emitter coupled logic) type transmitter circuit and an ECL type receiver circuit for receiving a signal derived from said transmission medium via said input/output terminal.

18. A bidirectional signal transmission circuit as claimed in claim 15, wherein said logic circuit elements include both of an ECL (emitter coupled logic) type transmitter circuit and an ECL type receiver circuit for receiving a signal derived from said transmission medium via said input/output terminal.

19. A bidirectional signal transmission circuit as claimed in claim 13, wherein said end circuit has an arbitrary impedance 1.2 times to 2.0 times higher than the characteristic impedance of said transmission medium.

20. A bidirectional signal transmission circuit as claimed in claim 14, wherein said end circuit has an arbitrary impedance 1.2 times to 2.0 times higher than the characteristic impedance of said transmission medium.

21. A bidirectional signal transmission circuit as claimed in claim 15, wherein said end circuit has an arbitrary impedance 1.2 times to 2.0 times higher than the characteristic impedance of said transmission medium.

22. A bidirectional signal transmission circuit as claimed in claim 13, wherein a transmission path for connecting said circuit elements with said end circuit located nearest said circuit elements, has a length shorter than, or equal to a value 1.5 times longer than a distance over which a signal is propagated during a changing time of said signal in said circuit elements.

23. A bidirectional signal transmission circuit as claimed in claim 14, wherein a transmission path for connecting said circuit elements with said end circuit located nearest said circuit elements, has a length shorter than, or equal to a value 1.5 times longer than a distance over which a signal is propagated during a changing time of said signal in said circuit elements.

24. A bidirectional signal transmission circuit as claimed in claim 15, wherein a transmission path for connecting said circuit elements with said end circuit located nearest said circuit elements, has a length shorter than, or equal to a value 1.5 times longer than a distance over which a signal is propagated during a changing time of said signal in said circuit elements.

* * * * *